US012775285B2

(12) United States Patent
Liao et al.

(10) Patent No.: US 12,775,285 B2
(45) Date of Patent: Oct. 27, 2026

(54) AUTOMATIC POOL CLEANING DEVICE AND ITS CONTROLLING METHOD

(71) Applicant: Shenzhen Aiper Intelligent Co., Ltd., Shenzhen (CN)

(72) Inventors: Jinhui Liao, Shenzhen (CN); Xianhe Wen, Shenzhen (CN); Xiantao Qian, Shenzhen (CN); Shuai Cao, Shenzhen (CN); Jiaxiang Zhang, Shenzhen (CN)

(73) Assignee: Shenzhen Aiper Intelligent Co., Ltd., Shenzhen (CN)

( * ) Notice: Subject to any disclaimer, the term of this patent is extended or adjusted under 35 U.S.C. 154(b) by 0 days.

(21) Appl. No.: 19/234,882

(22) Filed: Jun. 11, 2025

(65) Prior Publication Data

US 2026/0244216 A1 Aug. 20, 2026

Related U.S. Application Data

(63) Continuation of application No. 19/221,675, filed on May 29, 2025.

(30) Foreign Application Priority Data

Feb. 17, 2025 (CN) ......................... 202510173776.1

(51) Int. Cl.
*E04H 4/16* (2006.01)
*G05D 1/243* (2024.01)
(Continued)

(52) U.S. Cl.
CPC ........... *G05D 1/648* (2024.01); *E04H 4/1654* (2013.01); *G05D 1/243* (2024.01); *G06T 7/246* (2017.01);
(Continued)

(58) Field of Classification Search
CPC ...... G05D 1/648; G05D 1/243; E04H 4/1654; G06T 7/246
See application file for complete search history.

(56) References Cited

U.S. PATENT DOCUMENTS

| | | | | |
|---|---|---|---|---|
| 10,408,912 B2 * | 9/2019 | Kumar | ...................... | G06T 7/20 |
| 2020/0095792 A1 * | 3/2020 | Miller | ................... | E04H 4/1654 |

(Continued)

FOREIGN PATENT DOCUMENTS

| | | | | |
|---|---|---|---|---|
| CN | 110185013 A * | 8/2019 | ........... | E02B 15/104 |
| CN | 111746728 A | 10/2020 | | |

(Continued)

OTHER PUBLICATIONS

Chinese Office Action dated Mar. 26, 2025 for corresponding Chinese Application No. 202510173776.1, filed Feb. 17, 2025.
Office Action dated Jul. 17, 2026 from the United States Patent and Trademark Office, for corresponding U.S. Appl. No. 19/221,675, filed May 29, 2025.

*Primary Examiner* — Scott A Browne
*Assistant Examiner* — Jason Nguyen
(74) *Attorney, Agent, or Firm* — David D. Brush; Westman, Champlin & Koehler, P.A.

(57) ABSTRACT

An automatic pool cleaning device and a method for controlling the automatic pool cleaning device. The method includes obtaining at least one real-time image of a scene in front of the automatic pool cleaning device during a movement of the automatic pool cleaning device on a bottom of a pool, obtaining real-time information of a target in the scene from the at least one real-time image, and controlling the movement of the automatic pool cleaning device on the bottom based on the real-time information.

19 Claims, 4 Drawing Sheets

(51) Int. Cl.

| | |
|---|---|
| ***G05D 1/648*** | (2024.01) |
| ***G06T 7/00*** | (2017.01) |
| ***G06T 7/246*** | (2017.01) |
| ***G06T 7/60*** | (2017.01) |
| ***G06T 7/66*** | (2017.01) |
| ***G06T 7/70*** | (2017.01) |
| ***G06T 7/73*** | (2017.01) |
| ***G06V 20/05*** | (2022.01) |
| ***G06V 20/58*** | (2022.01) |
| *G05D 101/20* | (2024.01) |
| *G05D 105/10* | (2024.01) |
| *G05D 107/00* | (2024.01) |
| *G05D 109/30* | (2024.01) |

(52) U.S. Cl.

CPC .................. *G06T 7/66* (2017.01); *G06T 7/73* (2017.01); *G06V 20/05* (2022.01); *G06V 20/58* (2022.01); *G05D 2101/20* (2024.01); *G05D 2105/10* (2024.01); *G05D 2107/29* (2024.01); *G05D 2109/38* (2024.01); *G06T 2207/30261* (2013.01); *G06V 2201/07* (2022.01)

(56) References Cited

U.S. PATENT DOCUMENTS

| | | | |
|---|---|---|---|
| 2021/0103293 A1 | 4/2021 | Li et al. | |
| 2022/0129004 A1* | 4/2022 | Sabzevari | G05D 1/246 |
| 2022/0334585 A1 | 10/2022 | Dai et al. | |
| 2022/0350342 A1 | 11/2022 | Guo et al. | |
| 2023/0067638 A1 | 3/2023 | Wang et al. | |
| 2023/0409040 A1 | 12/2023 | Dai et al. | |
| 2024/0126265 A1 | 4/2024 | Ebrahimi Afrouzi et al. | |
| 2025/0013245 A1 | 1/2025 | Nishibeppu et al. | |
| 2025/0143529 A1* | 5/2025 | Gong | A47L 11/4011 |
| 2025/0297488 A1 | 9/2025 | Dzindo et al. | |
| 2025/0315062 A1 | 10/2025 | Sun et al. | |
| 2026/0072447 A1 | 3/2026 | Qian et al. | |

FOREIGN PATENT DOCUMENTS

| | | | | |
|---|---|---|---|---|
| CN | 114109095 A | | 3/2022 | |
| CN | 116138653 A | * | 5/2023 | A47L 11/00 |
| CN | 119356345 A | | 1/2025 | |
| EP | 2960741 A2 | | 12/2015 | |

* cited by examiner

AUTOMATIC POOL CLEANING DEVICE AND ITS CONTROLLING METHOD

CROSS-REFERENCE

This is a continuation of U.S. patent application Ser. No. 19/221,675, filed May 29, 2025, which claims a benefit of, and priority to Chinese Patent Application No. 202510173776.1 filed on Feb. 17, 2025, the disclosures of which are hereby expressly incorporated by reference herein in their entireties.

TECHNICAL FIELD

The present disclosure relates to an automatic pool cleaning device and a method for controlling the automatic pool cleaning device.

BACKGROUND

An automatic pool cleaning device may be utilized to automatically clean pool facilities such as swimming pools. For example, the automatic pool cleaning device may be configured to run its cleaning mechanisms while moving on the bottom, wall, or surface of the pool to filter water and absorb dirt.

SUMMARY

In a first aspect, disclosed is a method for controlling an automatic pool cleaning device. The method comprises obtaining at least one real-time image of a scene in front of the automatic pool cleaning device during a movement of the automatic pool cleaning device on a bottom of a pool, obtaining real-time information of a target in the scene from the at least one real-time image, and controlling the movement of the automatic pool cleaning device on the bottom based on the real-time information.

In one or more embodiments, the real-time information comprises at least one of a type of the target, a position of the target, a size of the target, a deviation angle of a center point of the target relative to a current orientation of the automatic pool cleaning device, and a distance between the target and the automatic pool cleaning device.

In one or more embodiments, the center point of the target comprises a center point of a circumscribed circle or rectangle of a contour of the target, a center point of an inscribed circle or polygon of the contour of the target, a point on the target and closest to the automatic pool cleaning device, a center point of a connecting line between two points on the contour of the target, or a point on a symmetry axis of the target. The two points on the contour may comprise any point on the contour, a point on the contour and farthest from the automatic pool cleaning device, or a point on the contour and closest to the automatic pool cleaning device.

In one or more embodiments, in a case where the type of the target indicates that the target is cleanable garbage, the controlling the movement of the automatic pool cleaning device on the bottom based on the real-time information comprises controlling, based on the position of the target, the automatic pool cleaning device to move toward the target.

In one or more embodiments, the controlling the movement of the automatic pool cleaning device on the bottom based on the real-time information comprises controlling, based on a position of the center point of the target, the automatic pool cleaning device to move toward the position of the center point of the target.

In one or more embodiments, in a case where the type of the target indicates that the target is cleanable garbage, the controlling the movement of the automatic pool cleaning device on the bottom based on the real-time information further comprises: tracking the target during moving toward the target; and in a case where the target disappears, controlling the automatic pool cleaning device to continue moving forward by a preset distance or for a preset duration to clean the target.

In one or more embodiments, the controlling the automatic pool cleaning device to continue moving forward by the preset distance or for the preset duration comprises: in a case where the target disappears, controlling the automatic pool cleaning device to find the target through a rotation; in a case where the target is found through the rotation, controlling the automatic pool cleaning device to move toward the target; in a case where the target is not found through the rotation, controlling the automatic pool cleaning device to continue to move forward in an orientation before the rotation by the preset distance or for the preset duration.

In one or more embodiments, the preset distance or preset duration depends on at least one of a size of a blind area of the automatic pool cleaning device and a position of a suction port at a bottom of the automatic pool cleaning device.

In one or more embodiments, in a case where the type of the target indicates that the target is an uncleanable obstacle, the controlling the movement of the automatic pool cleaning device on the bottom based on the real-time information comprises: determining whether the automatic pool cleaning device will collide with the target in a case of continuing moving forward, based on at least one of the size of the target, the position of the target, and the deviation angle of the center point of the target relative to the current orientation of the automatic pool cleaning device; and controlling the automatic pool cleaning device to continue moving forward in a case where it is determined that the automatic pool cleaning device will not collide with the target in a case of continuing moving forward.

In one or more embodiments, the target comprises a preset target, a distance between the preset target and the automatic pool cleaning device being within a preset range.

In one or more embodiments, the at least one real-time image is obtained by a monocular camera.

Also disclosed is an automatic pool cleaning device comprising an image sensor configured to obtain at least one real-time image of a scene in front of the automatic pool cleaning device during a movement of the automatic pool cleaning device on a bottom of a pool, and a controller configured to execute the above method.

In one or more embodiments, the image sensor comprises a monocular camera.

DETAILED DESCRIPTION

Figure 1:
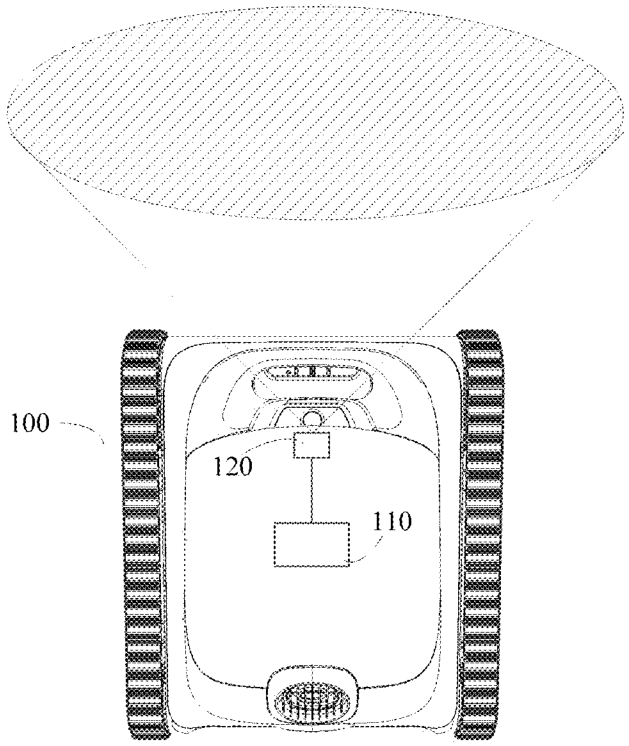
FIG. 1 illustrates an example of an automatic pool cleaning device in an embodiment.

Embodiments of the present disclosure will be described hereinafter in detail with reference to accompany drawings. In the drawings, the same reference numbers will be assigned to the same or equivalent parts for which descriptions will not be repeated.

Sensors, such as ultrasonic sensors, may be arranged on the automatic pool cleaning device to sense surrounding targets, such as cleanable garbage and uncleanable obstacles, during the movement of the automatic pool cleaning device in the pool or on the water surface, so that the automatic pool cleaning device may avoid or by pass the obstacles in the pool or on the water surface, or may try to cross the obstacles. However, for example, the automatic pool cleaning device may also avoid or bypass the cleanable garbage that needs to be cleaned in the pool or on the water surface, or may collide with uncleanable obstacles many times, resulting in a reduction in cleaning efficiency and/or service life of the automatic pool cleaning device.

The automatic pool cleaning device in one or more embodiments can identify types of targets in the pool, and can clean the pool more intelligently according to the types of targets.

FIG. 1 schematically shows an exemplary automatic pool cleaning device 100 in an embodiment, which is also referred to simply as "device 100" hereinafter.

The device 100 may be configured with a housing, a water inlet (or suction port), a water outlet, and one or more parts/components such as a water pump, a filter, and a driving mechanism. For example, the driving mechanism may include: a power mechanism, such as a motor and a water pump; and a traveling mechanism driven by the power mechanism, such as traveling wheels, crawlers, water nozzles, and propellers. For example, the device 100 may be configured to absorb water in the pool and garbage in the water, into the device 100 via the water inlet (or suction port) with a force generated by the water pump, and to discharge the water filtered by the filter back into the pool via the water outlet, while moving on the bottom, wall or water surface of the pool with the driving mechanism.

As shown in FIG. 1, the device 100 is further equipped with an image sensor 120 and a controller 110.

The image sensor 120 may include an image sensor such as a monocular camera and/or a binocular camera. For example, the image sensor 120 may be arranged at a forepart of the device 100, or may be arranged at least to face forward, to obtain or catch real-time images of a scene in front of the device 100, for example the shaded area in FIG. 1, while the device 100 is cleaning in a pool or on the water surface.

The controller 110 may include any one or more circuits and/or modules that can process data and/or execute instructions and are suitable for the device 100, such as a central processing unit (CPU), a graphics processing unit (GPU), a field programmable gate array (FPGA), or the like. For example, the controller 110 may include an application specific integrated circuit (ASIC), or a customized processor such as a tensor processor (TPU), a brain processor (BPU), a deep learning processor (DPU), and a neural network processor (NPU). For example, the controller 110 may also include circuits and/or modules for accelerating operations, such as a multiplication accumulator (MAC).

The controller 110 may be configured to perform data processing and/or control related to cleaning and/or other functions of the device 100, for example by executing programs stored in a memory of the device 100, and/or based on signals and/or instructions from a control panel or control terminal of the device 100, and/or sensed data from one or more sensors of the device 100 such as the image sensor 120.

For example, the controller 110 may be configured to analyze and/or process at least one real-time image of the scene in front of the device 100 captured by the image sensor 120 while moving on the bottom of the pool, and to control operations of one or more parts of the device 100, such as the driving mechanism, the traveling mechanism, and the like, based on the analysis and/or processing results.

Figure 2:
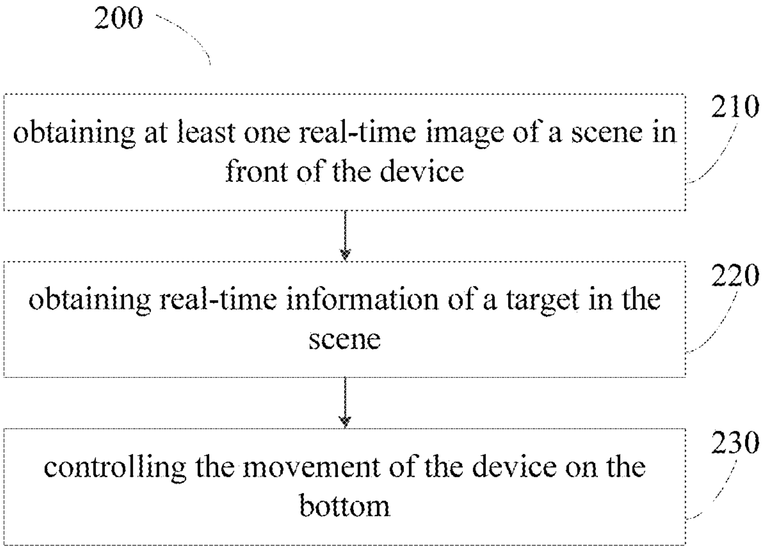
FIG. 2 illustrates an example of a method for controlling the automatic pool cleaning device in an embodiment.

FIG. 2 schematically shows an exemplary method 200 for controlling the device 100 in an embodiment.

The method 200 may be executed for example by the controller 110 of the device 100 and other parts/components of the device 100, such as the image sensor 120, and may include a step 210 for obtaining at least one real-time image of a scene in front of the device 100 while the device 100 is moving on a bottom of a pool, a step 220 for obtaining real-time information of a target in the scene in front of the device 100 from at least one real-time image obtained in the step 210, and a step 230 for controlling the movement of the device 100 on the bottom of the pool based on the real-time information of the target in the scene in front of the device 100 obtained in the step 220.

By the method 200, the device 100 may be enabled to identify the targets of the scene in front of the device 100, and to obtain real-time information on the targets based on which an intelligent control may be achieved for the movement of the device 100 on the bottom of the pool, so that the device 100 can avoid unnecessary collisions while ensuring cleaning coverage, which is beneficial to improving cleaning efficiency and prolonging the service life of the device 100.

Details and examples of the method 200 are described below with reference to the drawings.

Figure 3:
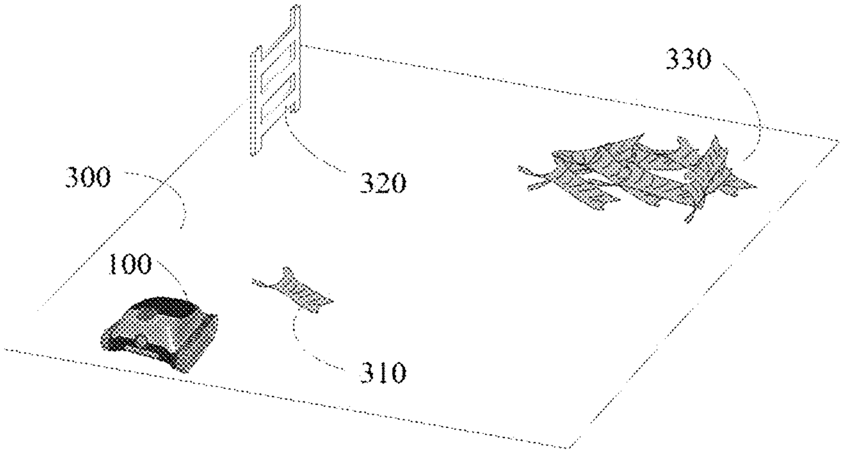
FIG. 3 illustrates an example of an environment for executing the method in an embodiment.

As shown in FIG. 3, there may be various targets with different types, sizes and/or shapes at different positions of the bottom 300 of the pool. For example, a first target 310 may be a single cleanable garbage such as a leaf and a branch. For example, a second target 320 may be an obstacle that cannot be cleaned, such as a ladder. For example, a third target 330 may be a mass of or an area including a plurality of scattered cleanable garbage which are relatively concentrated, wherein the mass or area may be determined for example in any suitable manner such as clustering, so that a plurality of scattered garbage in close proximity may be identified/recognized as a whole mass or area, or say, a whole target.

The method 200 may be executed to control the device 100 for example when the device 100 enters a pool (e.g., travels into the pool, or is placed in the pool) and moves on the bottom 300 of the pool. The method 200 may further include a step for starting the device 100 to move on the bottom 300, which may be performed for example before the step 210. Further, one or more steps in the method 200 may be repeatedly performed many times, and different steps in the method 200 may be performed in series or in parallel.

Figure 4:
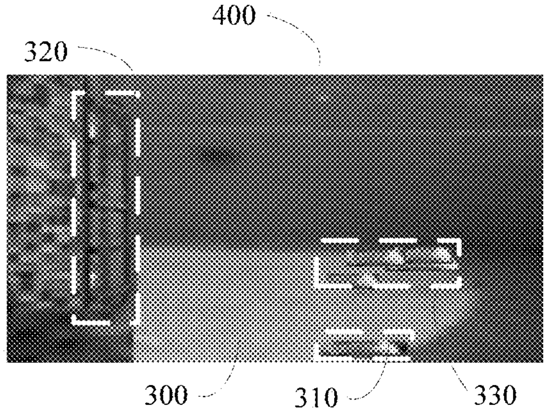
FIG. 4 illustrates an example of a real-time image in an embodiment.

During the movement of the device 100 on the bottom 300, at least one real-time image about the scene in front of the device 100 may be obtained or captured by the image sensor 120 (for example, in response to an instruction from the controller 110), such as the real-time image 400 as shown in FIG. 4 with the first target 310, the second target 320, and the third target 330 captured.

For example, the at least one real-time image such as the real-time image 400 may be or include at least one two-dimensional image obtained by the image sensor 120. In another embodiment, for example, in a case where the image sensor 120 includes a binocular camera, the at least one real-time image such as the real-time image 400 may be or include at least one three-dimensional image obtained by the image sensor 120.

The real-time image 400 may be processed and analyzed by any suitable method or model, such as a convolutional neural network, to obtain, from the real-time image 400, at least one real-time information about at least one of the first target 310, the second target 320 and the third target 330.

The real-time information about a target may include but not limited to one or more of a type of the target, a location of the target, a size of the target, a deviation angle of a center point of the target relative to a current orientation of the device 100, and a distance between the target and the device 100, for example.

The type of the target may indicate whether the target is cleanable garbage or garbage area/mass (for example, the first target 310 and the third target 330) or an uncleanable obstacle (for example, the second target 320).

The center point of the target may include but is not limited to: a center point of a circumscribed circle or circumscribed rectangle of a contour of the target, for example, the smallest circumscribed circle or the smallest circumscribed rectangle of the contour of the target; a center point of an inscribed circle or polygon of the contour of the target; a point on the target and closest to the device 100; a center point on a connecting line between two points on the contour of the target, wherein, for example, one of the two points may include, but is not limited to, a point on the contour of the target and farthest from the device 100, a point on the contour of the target and closest to the device 100, the lowest point on the contour of the target, or the highest point on the contour of the target; a point on a symmetry axis of the target; or any other suitable point that can represent the target, for example, a geometric center point of a bounding shape or box of the target, such as a rectangular bounding shape, a trapezoidal bounding shape, or a triangular bounding shape of the target. For example, among center points of connecting lines of any two points on the contour of the target, a center point of the longest connecting line may be selected as the center point of the target.

The device 100 may be controlled to move toward the target based on the real-time information on the target, so that the device 100 may directly pass through the center point of the target. Thus, for example, the device 100 may clean more parts of the target at one time when passing through the target, which is more efficient.

For example, the contour of a target may include multiple vertices, and a center point of a circumscribed circle surrounding or connecting at least two of the multiple vertices may be taken as the center point of the target. When selecting only two vertices on the contour of the target, for example, the center of the circumscribed circle may coincide with a center of a circumscribed rectangle or other circumscribed shapes of the contour of the target. For example, for the contour of the area or mass including a plurality of garbage, two vertices on the contour of such a target may be selected to determine a circumscribed shape for the contour of the target, and any suitable circumscribed shape may be used for the contour of the target, such as a circumscribed circle or a circumscribed rectangle. For example, a circumscribed circle may be determined for the contour of the target by making the two vertices on the contour of the target as two end points on a diameter of the circumscribed circle. For example, a circumscribed rectangle may be determined for the contour of the target by making a connecting line between the two vertices on the contour of the target parallel to a long or short side of the circumscribed rectangle. For example, the two vertices for determining circumscribed shape of the contour of the target may include the lowest point and the highest point on the contour of the target in the captured real-time image.

The term "center point" herein may refer to a geometric center point of the contour of the target, or a point near the geometric center point of the contour of the target, such as a point whose distance from the geometric center point is less than a preset threshold. For example, in the example of FIG. 12, the center point P1 of the circumscribed circle of the contour of the target may refer to the point P1 itself, or a point P2 or P3 whose distance from P1 is less than a preset threshold.

Figure 5:
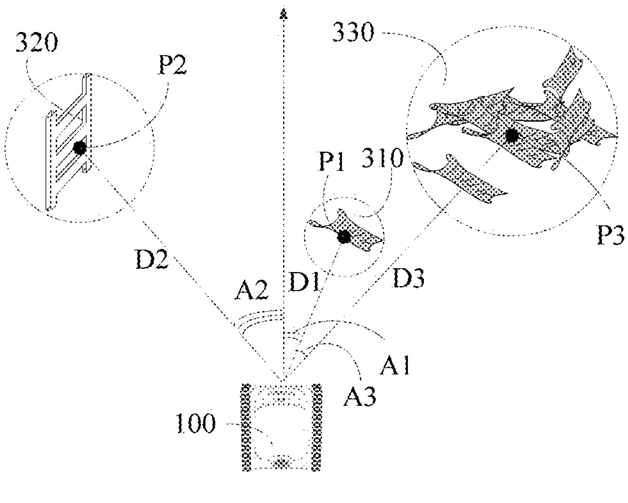
FIG. 5 illustrates an example of a target in an embodiment.

For example, as shown in FIG. 5, the center point P1 of the first target 310 may be the center of the circumscribed circle of the contour of the first target 310, and may be used to represent the first target 310. The center point P2 of the second target 320 may be the center of the circumscribed circle of the contour of the second target 320, and may be used to represent the second target 320. The center P3 of the third target 330 may be the center of the circumscribed circle of the contour of the third target 330, and may be used to represent the third target 330.

The position of the center point of the target may be represented by any suitable form of data in any system.

For example, for the center point P1 of the first target 310, two-dimensional coordinate data of the point P1 in the two-dimensional image coordinate system of the real-time image 400 may be determined, and/or three-dimensional coordinate data of the point P1 in the three-dimensional image coordinate system of the real-time image 400 may also be determined.

For example, for the center point P1 of the first target 310, a current position of the device 100 may be taken as an origin, and an axis from the origin may be determined based on a current orientation of the device 100. Then, a distance D1 from the point P1 to the device 100 and an angle A1 of the point P1 deviated from the axis may be determined based on the real-time image 400 and/or real-time sensed values from other sensors (e.g., an ultrasonic ranging sensor, or the like) of the device 100, and data on the position of the center point P1 representing the first target 310 may be or include a tuple (D1, A1) of the determined distance D1 and angle A1.

The deviation angle of the center point of the target from the current orientation of the device 100 may be measured or determined in any suitable way and may be represented by data in any suitable form.

For example, in a case where a field of view distance relative to the device 100 (or an actual width of a scene that can be observed by lens of the image sensor 120 at a certain distance) of each target captured in the real-time image is substantially consistent with each other, the deviation angle of the center point of the target relative to the current orientation of the device 100 may be measured and represented by a vertical distance from the center point of the target to the axis corresponding to the current orientation of the device 100.

For example, an angle between the current orientation of the device 100 and a connecting line from the center point of the target to the device 100 may also be used to measure and represent the deviation angle of the center point of the target relative to the current orientation of the device 100. For example, as shown in FIG. 5, the deviation angle of the center point P1 of the first target 310 from the current orientation of the device 100 may be represented as an included angle A1, the deviation angle of the center point P2 of the second target 320 from the current orientation of the device 100 may be represented as an included angle A2, and the deviation angle of the center point P3 of the third target 330 from the current orientation of the device 100 may be represented as an included angle A3.

After obtaining the real-time information on the target in the scene in front of the device 100 from the real-time image 400, the movement of the device 100 on the bottom 300 may be controlled based on the obtained real-time information.

For example, in a case where the first target 310 is within a preset range from the device 100, or where the first target 310 includes a preset target (for example, a preset type of target) within a preset range from the device 100, the movement of the device 100 on the bottom 300 may be controlled based on the real-time information on the first target 310.

Figure 6:
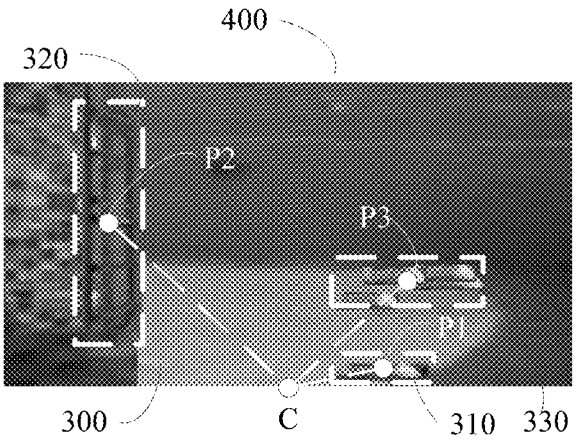
FIG. 6 illustrates an example of determining a distance between the target and the automatic pool cleaning device in an embodiment.

For example, as shown in FIG. 5, among the first target 310, the second target 320, and the third target 330 captured in the real-time image 400, the distance D2 between the first target 310 and the device 100 is smaller than the distance D2 between the second target 320 and the device 100, and is also smaller than the distance D3 between the third target 330 and the device 100. Or, as shown in FIG. 6, among the first target 310, the second target 320, and the third target 330 captured in the real-time image 400, a distance between the center point P1 of the first target 310 and a center point C at the lower edge of the real-time image 400 is smaller than a distance between the center point P2 of the second target object 320 and the point C, and is also smaller than a distance between the center point P3 of the third target object 330 and the point C. Then, the first target 310 may be determined to be the closest to the device 100, and may be selected. Then, the movement of the device 100 on the bottom 300 may be controlled based on the real-time information on the first target 310.

In a case where the type of the selected target indicates that the target is cleanable garbage, the device 100 may be controlled to move toward the target, based on the position of the target. For example, the device 100 may be controlled, based on the position of the center point of the target, to move toward the position of the center point of the target.

Figure 7:
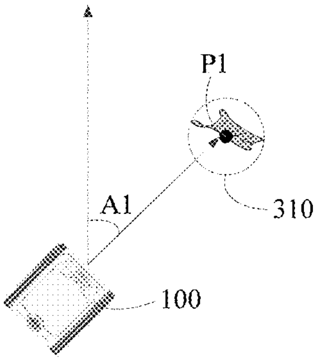
FIG. 7 illustrates an example of an execution of the method in an embodiment.

For example, as shown in FIG. 7, in a case where the first target 310 is selected, if a current orientation (as shown by the dashed arrow in FIG. 7) of the device 100 is not pointing to the center point P1 of the first target 310, the device 100 may be controlled to rotate by the deviation angle A1 of the point P1 with respect to the dashed arrow in FIG. 7, so that the orientation of the device 100 after rotation may point to the center point P1 of the first target 310, as shown by the solid arrow in FIG. 7. Then, the device 100 may be controlled to move toward the position of the center point P1 of the first target 310, to clean the first target 310. The device 100 moves toward the center of the target, so that the device 100 may absorb parts of the target as much as possible when passing through the target. Compared with the case of not passing through the center of the target, the device 100 may miss less when absorbing the target. For example, when the size of the target is close to or smaller than the water inlet (or suction port) of the device, the cleaning effect may be better.

Figure 8:
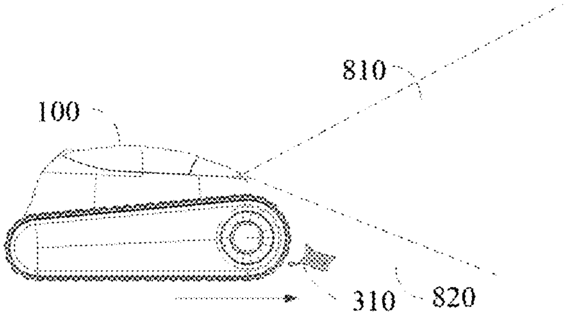
FIG. 8 illustrates an example of a blind area in an embodiment.

During the movement of the control device toward the first target 310, the first target 310 may be tracked. As shown in FIG. 8, in a case where the first target 310 disappears from a current field of view 810 of the image sensor 120 and enters a current blind area 820 of the image sensor 120, the device 100 may be controlled to move forward by a preset distance or for a preset duration, to ensure that the first target 310 may be cleaned. For example, the preset distance or the preset duration may be determined based on a size of the blind area of the image sensor 120 of the device 100. Further, the preset distance or the preset duration may also be determined for example based on a position of the water inlet or suction port on the bottom of the device 100.

There may be a deviation in the movement of the device 100 even if the device 100 moves in a straight line in the water, for example due to the resistance in the pool, the fluctuation of water flow, or the like. In a case where the first target 310 disappears from the current field of view 810 of the image sensor 120 and enters the current blind area 820 of the image sensor 120, the device 100 may be controlled to rotate to try to find the disappeared first target 310. In a case where the first target 310 is found through the rotation, the device 100 may be controlled to move toward the first target 310. In a case where the first target 310 is not found through the rotation, the device 100 may be controlled to continue to move forward by a preset distance or for a preset duration in a previous orientation before the rotation. Thus, the device 100 may be enabled to find and clean the first target 310 more accurately.

In a case where the type of the selected target indicates that the target is an uncleanable obstacle, it may be determined whether the device 100 will collide with the target if it continues moving forward in the current orientation. For example, the determination may be made based on at least one of the size of the target, the position of the target, and the deviation angle of the center point of the target with respect to the current orientation of the device 100. In a case of determining that the device 100 will not collide with the target, the device 100 may be controlled to continue moving forward in the current orientation. Otherwise, for example, the device 100 may be controlled to rotate by an angle and then to move forward, so that the device 100 may avoid or bypass the target.

Figure 9:
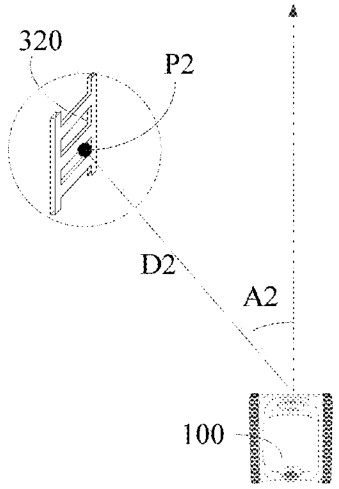
FIG. 9 illustrates an example of an execution of the method in an embodiment.

For example, as shown in FIG. 9, in a case where the second target 320 is selected, a real-time distance D2 between the device 100 and the second target 320 may be determined based on the size of the second target 320. Then, a deviation angle A2 of the center point P2 of the second target 320 with respect to the current orientation (as shown by the dashed arrow in FIG. 9) of the device 100 may be determined for example when the distance D2 reaches a preset value (for example, 50 cm, 1 meter, or any other suitable value).

For example, in a case where the deviation angle A2 is greater than a preset angle threshold (which, for example, may be predetermined based on a width of the body of the device 100), as shown in FIG. 9, it may be determined that the device 100 will not collide with the second target 320 even if it continues moving forward in the current orientation as shown by the dashed arrow in FIG. 9, and the device 100 may be controlled to continue moving forward in the current orientation as shown by the dashed arrow in FIG. 9.

Figure 10:
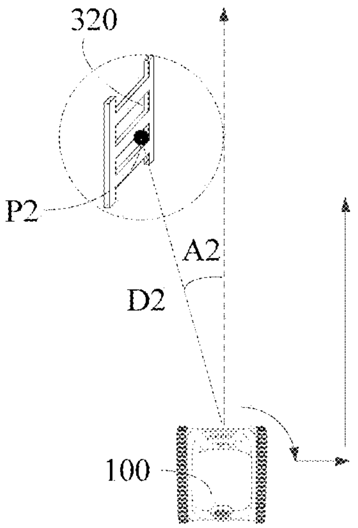
FIG. 10 illustrates an example of an execution of the method in an embodiment.
Figure 11:
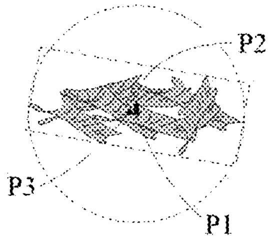
FIG. 11 illustrates an example of a center point of a target in an embodiment.

For example, in a case where the deviation angle A2 is less than or equal to the preset angle threshold, as shown in FIG. 10, it may be determined that the device 100 will collide with the second target 320 if it continues moving forward in the current orientation as shown by the dashed arrow in FIG. 10. Then, the device 100 may be controlled to change its orientation, and to continue to move forward according to a new route as shown by the solid arrow in FIG. 10 to avoid colliding with the second target 320.

As described above, by the method 200, the device 100 may be enabled to identify the targets of the scene in front of the device 100, and to obtain real-time information on the targets based on which an intelligent control may be achieved for the movement of the device 100 on the bottom of the pool, so that the device 100 can avoid unnecessary collisions while ensuring cleaning coverage, which is beneficial to improving cleaning efficiency and prolonging the service life of the device 100.

The basic principles of the present disclosure have been described above in connection with the embodiments. However, it is appreciated that the advantages, benefits, effects, and so on, which have been mentioned herein, are only examples rather than limitations, and these advantages, benefits, effects, and so on should not be considered as necessary for each embodiment of this disclosure. In addition, the foregoing details are only for the purpose of illustration and easy understanding, rather than limitations, and the foregoing details do not limit that the present disclosure must be implemented with the foregoing details.

The block diagrams of devices, apparatuses, equipment and systems involved in this disclosure are only illustrative examples and are not intended to require or imply that they must be connected, arranged or configured in the manners shown in the block diagrams. In different embodiments, these devices, apparatuses, equipment and systems may be connected, arranged or configured in any suitable manners.

In addition, wordings such as "including", "comprising" and "having" are open words, which mean and is interchangeable with the wording "including but not limited to". The wordings "or" and "and" herein refer to and may be interchangeable with "and/or" unless the context clearly indicates otherwise. The wording "such as" herein refers to and may be interchangeable with the phrase "such as but not limited to".

It is appreciated that in the apparatuses, equipment and methods of the present disclosure, each component or step may be decomposed and/or recombined. Any decomposition and/or recombination should be regarded as equivalents of the present disclosure.

In this disclosure, modifiers without quantifiers such as "first" and "second" are intended to distinguish different elements/components/circuits/modules/apparatuses/steps, and are not used to emphasize an order, positional relationship, importance, priority level, or the like. Sometimes, modifiers with quantifiers such as "first piece of" and "second piece of" may be used to emphasize the order, positional relationship, importance, priority level and so on for different components/components/circuits/modules/apparatuses/steps.

The foregoing description has been presented for purposes of illustration and description. This description is not intended to limit the embodiments of the present disclosure to the forms disclosed herein. Although several example aspects and embodiments have been described above, those skilled in the art may recognize some variations, modifications, changes, additions and sub-combinations thereof.

What is claimed is:

1. A method for controlling an automatic pool cleaning device comprising:

obtaining, by an image sensor of the automatic pool cleaning device, at least one real-time image of a scene in front of the automatic pool cleaning device during a movement of the automatic pool cleaning device on a bottom of a pool;

obtaining real-time information of a target in the scene from the at least one real-time image, the real-time information comprising a type of the target; and controlling the movement of the automatic pool cleaning device on the bottom based on the real-time information, wherein, in a case where the type of the target indicates that the target is cleanable garbage, the controlling the movement of the automatic pool cleaning device on the bottom based on the real-time information comprises:

tracking the target by the image sensor during moving toward the target, and in a case where the target disappears from a current field of view of the image sensor, determining that the target enters a current blind area of the image sensor, and controlling the automatic pool cleaning device to continue moving forward by a preset distance or for a preset duration to clean the target.

2. The method of claim 1, wherein the real-time information further comprises a position of the target, a size of the target, a deviation angle of a center point of the target relative to a current orientation of the automatic pool cleaning device, and a distance between the target and the automatic pool cleaning device.

3. The method of claim 2, wherein the center point of the target comprises a center point of a circumscribed circle or rectangle of a contour of the target, a center point of an inscribed circle or polygon of the contour of the target, a point on the target and closest to the automatic pool cleaning device, a center point of a connecting line between two points on the contour of the target, or a point on a symmetry axis of the target.

4. The method of claim 3, wherein the two points on the contour comprises any point on the contour, a point on the contour and farthest from the automatic pool cleaning device, or a point on the contour and closest to the automatic pool cleaning device.

5. The method of claim 2, wherein, in the case where the type of the target indicates that the target is cleanable garbage, the controlling the movement of the automatic pool cleaning device on the bottom based on the real-time information comprises:

controlling the automatic pool cleaning device to move toward the target, based on the position of the target.

6. The method of claim 3, wherein the controlling the movement of the automatic pool cleaning device on the bottom based on the real-time information comprises:

controlling the automatic pool cleaning device to move toward the position of the center point of the target, based on a position of the center point of the target.

7. The method of claim 1, wherein, the controlling the automatic pool cleaning device to continue moving forward by the preset distance or for the preset duration comprises:

controlling the automatic pool cleaning device to find the target through a rotation;

in a case where the target is found through the rotation, controlling the automatic pool cleaning device to move toward the target; and in a case where the target is not found through the rotation, controlling the automatic pool cleaning device to continue to move forward in an orientation before the rotation by the preset distance or for the preset duration.

8. The method of claim 1, wherein the preset distance or preset duration depends on at least one of a size of a blind area of the automatic pool cleaning device and a position of a suction port at a bottom of the automatic pool cleaning device.

9. The method of claim 2, wherein, in a case where the type of the target indicates that the target is an uncleanable obstacle, the controlling the movement of the automatic pool cleaning device on the bottom based on the real-time information comprises:

determining whether the automatic pool cleaning device will collide with the target in a case of continuing moving forward, based on at least one of the size of the target, the position of the target, and the deviation angle of the center point of the target relative to the current orientation of the automatic pool cleaning device; and controlling the automatic pool cleaning device to continue moving forward in a case where it is determined that the automatic pool cleaning device will not collide with the target in a case of continuing moving forward.

10. The method of claim 1, wherein the target comprises a preset target, a distance between the preset target and the automatic pool cleaning device being within a preset range.

11. The method of claim 1, wherein the at least one real-time image is obtained by a monocular camera.

12. An automatic pool cleaning device comprising:

an image sensor configured to obtain at least one real-time image of a scene in front of the automatic pool cleaning device during a movement of the automatic pool cleaning device on a bottom of a pool; and a controller configured to execute programs stored in a memory of the automatic pool cleaning device to perform obtaining real-time information of a target in the scene from the at least one real-time image, and controlling the movement of the automatic pool cleaning device on the bottom based on the real-time information, wherein the real-time information comprises a type of the target, and in a case where the type of the target indicates that the target is cleanable garbage, the controlling the movement of the automatic pool cleaning device on the bottom based on the real-time information comprises:

tracking the target by the image sensor during moving toward the target, and in a case where the target disappears from a current field of view of the image sensor, determining that the target enters a current blind area of the image sensor, and controlling the automatic pool cleaning device to continue moving forward by a preset distance or for a preset duration to clean the target.

13. The automatic pool cleaning device of claim 12, wherein the image sensor comprises a monocular camera.

14. The automatic pool cleaning device of claim 12, wherein the real-time information further comprises at least one of a position of the target, a size of the target, a deviation angle of a center point of the target relative to a current orientation of the automatic pool cleaning device, and a distance between the target and the automatic pool cleaning device.

15. The automatic pool cleaning device of claim 14, wherein the center point of the target comprises a center point of a circumscribed circle or rectangle of a contour of the target, a center point of an inscribed circle or polygon of the contour of the target, a point on the target and closest to the automatic pool cleaning device, a center point of a connecting line between two points on the contour of the target, or a point on a symmetry axis of the target.

16. The automatic pool cleaning device of claim 15, wherein the two points on the contour comprises any point on the contour, a point on the contour and farthest from the automatic pool cleaning device, or a point on the contour and closest to the automatic pool cleaning device.

17. The automatic pool cleaning device of claim 14, wherein, in the case where the type of the target indicates that the target is cleanable garbage, the controlling the movement of the automatic pool cleaning device on the bottom based on the real-time information comprises:

controlling the automatic pool cleaning device to move toward the target, based on the position of the target.

18. The automatic pool cleaning device of claim 12, wherein, the controlling the automatic pool cleaning device to continue moving forward by the preset distance or for the preset duration comprises:

controlling the automatic pool cleaning device to find the target through a rotation;

in a case where the target is found through the rotation, controlling the automatic pool cleaning device to move toward the target; and in a case where the target is not found through the rotation, controlling the automatic pool cleaning device to continue to move forward in an orientation before the rotation by the preset distance or for the preset duration.

19. The automatic pool cleaning device of claim 14, wherein, in a case where the type of the target indicates that the target is an uncleanable obstacle, the controlling the movement of the automatic pool cleaning device on the bottom based on the real-time information comprises:

determining whether the automatic pool cleaning device will collide with the target in a case of continuing moving forward, based on at least one of the size of the target, the position of the target, and the deviation angle of the center point of the target relative to the current orientation of the automatic pool cleaning device; and controlling the automatic pool cleaning device to continue moving forward in a case where it is determined that the automatic pool cleaning device will not collide with the target in a case of continuing moving forward.

* * * * *